United States Patent [19]

Sorsche et al.

[11] 4,309,970
[45] Jan. 12, 1982

[54] INTERNAL COMBUSTION ENGINE WITH AGGREGATE UNITS ARRANGED IN AN AUTOMOTIVE VEHICLE

[75] Inventors: Joachim H. Sorsche, Stuttgart; Erich Ableitner, Remseck; Ernst Gobien, Weinstadt; Manfred Minning, Esslingen, all of Fed. Rep. of Germany

[73] Assignee: Daimler-Benz Aktiengesellschaft, Stuttgart, Fed. Rep. of Germany

[21] Appl. No.: 37,772

[22] Filed: May 10, 1979

[30] Foreign Application Priority Data

May 10, 1978 [DE] Fed. Rep. of Germany ....... 2820338

[51] Int. Cl.³ .......................... F02B 77/08; F02P 7/02
[52] U.S. Cl. ................................ 123/198 D; 64/11 B; 123/41.11; 123/195 A; 180/70 R; 180/232
[58] Field of Search ........... 123/195 R, 195 A, 198 R, 123/198 D, 198 E, 41.11; 64/11 B, 1 S; 180/232, 70 R; 280/777

[56] References Cited

U.S. PATENT DOCUMENTS

| 3,661,237 | 5/1972 | Thompson | 123/41.11 |
| 3,754,411 | 8/1973 | Orann | 64/11 B |
| 3,863,617 | 2/1975 | Thien et al. | 123/198 E |
| 3,903,982 | 9/1975 | Winsen et al. | 180/70 R |
| 4,071,008 | 1/1978 | Skatsche et al. | 123/198 E |

FOREIGN PATENT DOCUMENTS 2448763  4/1976  Fed. Rep. of Germany ...... 64/11 B

*Primary Examiner*—Craig R. Feinberg
*Attorney, Agent, or Firm*—Craig and Antonelli

[57] ABSTRACT

An internal combustion engine arranged in an automotive vehicle with optionally driven units or the like, for example, units driven by way of pulleys. The units extend toward a front if the internal combustion engine is arranged in a front compartment of the automotive vehicle and extend toward the rear beyond the internal combustion engine if the engine is disposed in a rear compartment. The units and optionally their drive elements are fashioned in such a way and/or are mounted to the internal combustion engine in such a manner that, in case of a collision, impact energy is absorbed at the units and/or their fasteners or mounting by the performance of deformation work, by overcoming frictional resistances, and/or by a displacement of viscous substances against a resistance.

11 Claims, 6 Drawing Figures

INTERNAL COMBUSTION ENGINE WITH AGGREGATE UNITS ARRANGED IN AN AUTOMOTIVE VEHICLE

The present invention relates to an internal combustion engine for an automotive vehicle which is provided with optional driven aggregate units or the like such as, for example, units driven by pulleys which units extend toward a front of the vehicle if the engine is arranged in a front engine compartment or extend toward a rear of the vehicle beyond the engine if the engine is disposed in a rear engine compartment of the vehicle.

A possibility normally provided in an automobile body to absorb impact energy in case of an impact or collision by deformation energy produced at the automobile body in a zone of the engine compartment is essentially limited with respect to the possible deformation distance by the internal combustion engine disposed in the engine compartment. Such limitation in deformation is not primarily due to the crankcase or cylinder block of the internal combustion engine, but rather is due to the presence of additional aggregates, optional units or the like attached at the front or laterally to the internal combustion engine which project beyond the engine in a direction opposite to that of the impact direction. This is particularly true in, for example, an in-line four-cylinder engine which is arranged in an engine compartment which can also accommodate an in-line six-cylinder engine, for in such situation, the spacing between the four-cylinder internal combustion engine and associated cooling fan disposed behind a heat exchanger or radiator is especially large and the so-called "hard length" of the internal combustion engine is likewise particularly long.

The aim underlying the present invention essentially resides in providing an arrangement whereby the "hard length" of an internal combustion engine is reduced in order to increase a deformation zone of a vehicle body in which the engine is arranged.

In accordance with the present invention, the units associated with the engine and, optionally, drive elements for such units such as, for example, pulleys or the like, are constructed in such a way and/or mounted to the internal combustion engine in such a manner that, in case of a collision, impact energy is absorbed at the units and/or their associated mountings or holders by the performance of deformation work and/or by overcoming frictional resistances, and/or by a displacement of viscous materials against a resistance.

By virtue of an arrangement such as proposed by the present invention, the "hard length" of an internal combustion engine is substantially reduced. Moreover, the deformation zone of the vehicle body can be made larger wherein the deformation work to be performed at the units and/or associated mountings or holders contributes advantageously toward absorbing the impact energy in front of the "hard length" of the internal combustion engine.

In accordance with the present invention, the impact absorbing means for absorbing impact energy through the performance of deformation work may be employed for mounting the units to the engine with the impact absorbing means being fashioned as conventionally constructed buffer pots, rolled tubes, grill-type tubes, or the like.

In lieu of impact absorbing elements, in accordance with yet further features of the present invention, the fastening means and/or mountings of the respective units may be provided with predetermined breaking zones or areas.

Moreover, it is possible in accordance with the present invention to fashion the fastening means and/or mounting means for the respective units to, for example, be telescopically compressible or otherwise be adapted to be axially shortened in such a way that a predetermined frictional force must be overcome during a deformation or buckling of the fastening means and/or mounting means upon the occurrence of an impact or collision. Furthermore, the fastening or mounting means may accommodate viscous materials adapted to be displaced against a resistance during a deformation or axial shortening of the fastening means and/or mounting means.

With internal combustion engines provided with units adapted to be driven by pulleys mounted at such units, or optionally also directly on a crankcase or engine block of the internal combustion engine, rims of the pulleys, provided with running tracks for accommodating drive belts, may, in accordance with the present invention, be fashioned so as to be collapsible or deformable in an axial direction. Moreover, the interconnection between hubs and rims of the pulleys may also be constructed so as to buckle outwardly upon the occurrence of a collision or an impact force acting on the respective units.

Accordingly, it is an object of the present invention to provide an internal combustion engine arrangement which avoids, by simple means, shortcomings and disadvantages encountered in the prior art.

Another object of the present invention resides in providing an internal combustion engine arrangement by which auxiliary units or aggregates mounted on the engine are utilized so as to absorb impact energy in case of an impact or collision.

A further object of the present invention resides in providing an internal combustion engine arrangement which maximizes the absorption of impact energy in a zone of the engine compartment.

These and other objects, features, and advantages of the present invention will become more apparent from the following description when taken in connection with the accompanying drawings which show, for the purposes of illustration only, several embodiments in accordance with the present invention, and wherein.

Figure 1:
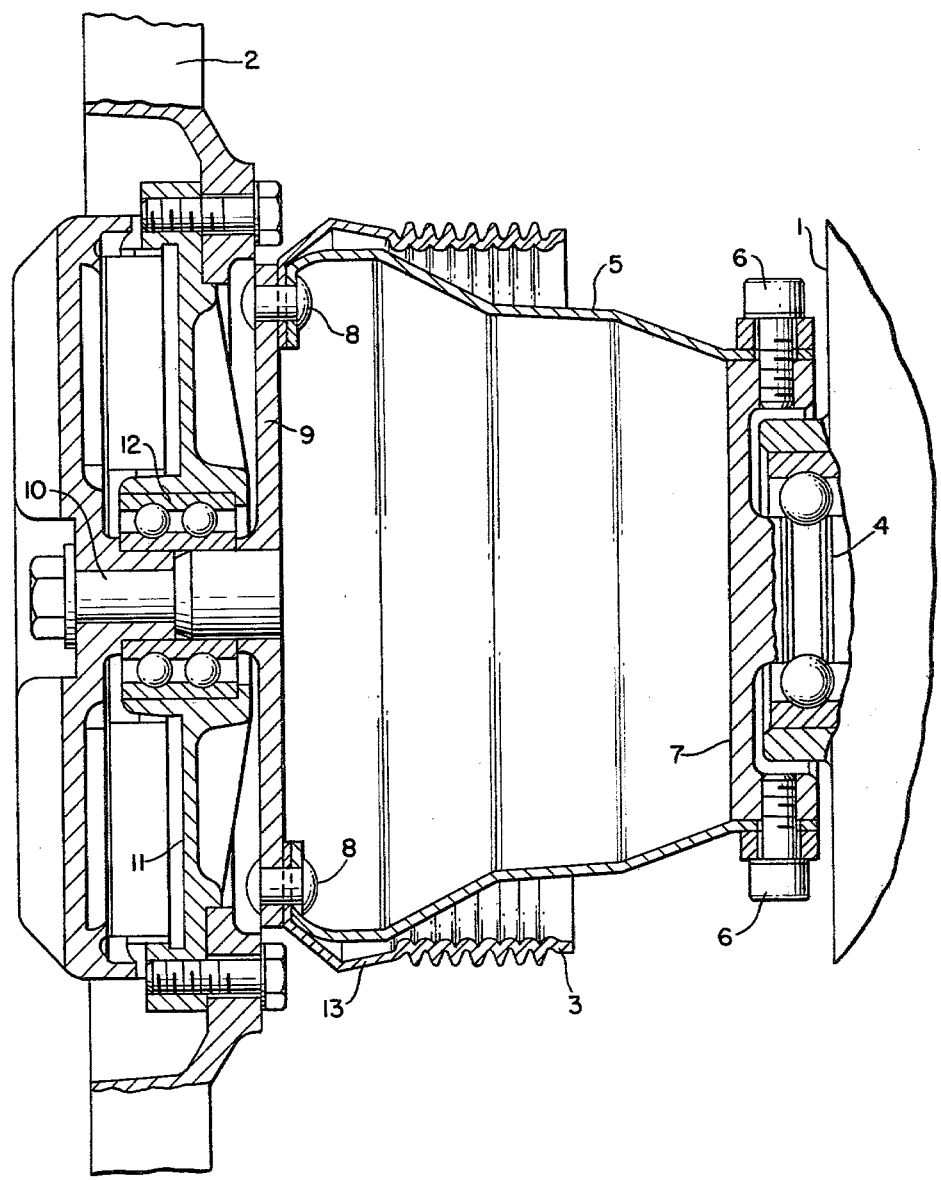
FIG. 1 is an axial cross-sectional view of an internal combustion engine having a cooling fan and associated driving pulley mounted thereat in accordance with the present invention.

Referring now to the drawings wherein like reference numerals are used throughout the various views to designate like parts and, more particularly, to FIG. 1, according to this figure, a fan 2 projects forwardly from a block or housing 1 of a schematically illustrated internal combustion engine which is arranged in a forwardly located engine compartment (not shown) of a passenger vehicle (not shown) in an in-line design with the fan 2 being adapted to be driven by a pulley 3 and supported at the block 1 by means of a shaft 4.

A buffer or energy absorbing pot-shaped member 5 is arranged between the shaft 4 and the cooling fan 2 so that, upon the occurrence of a collision of the passenger vehicle, the fan 2, located at a relatively great distance from the block 1, contributes with its associated mounting and associated drive mechanism toward an absorption of impact energy by the performance of deformation work.

The buffer pot 5, which is arranged in a similar manner in some passenger vehicles between a steering wheel and steering spindle, is attached by way of fastening means such as, for example, screws 6, to a flange 7 of the shaft 4. Further fastening means such as rivets 8 are provided for attaching the buffer pot 5 to a flange 9 of a shaft 10.

A coupling means 11 is connected to the shaft 10 for rotation therewith and, under certain operating conditions, the coupling means 11 connects the shaft 10 with the cooling fan 2 which is supported on the shaft 10 by means of an anti-friction roller bearing assembly 12 so that the cooling fan 2 is capable of rotating with the shaft 10. The cooling fan 2 is adapted to be driven by way of a pulley 3 which accommodates a grooved flat belt (not shown). A web 13 of the pulley 3 is attached to the flange 9 of the shaft 10 by way of the rivets 8. The pulley 3 is constructed so as to be compressible in an axial direction upon the occurrence of an impact force effective on the cooling fan 2. The web 13 is constructed so as to have a shape which permits an axial shortening thereof.

Figure 2:
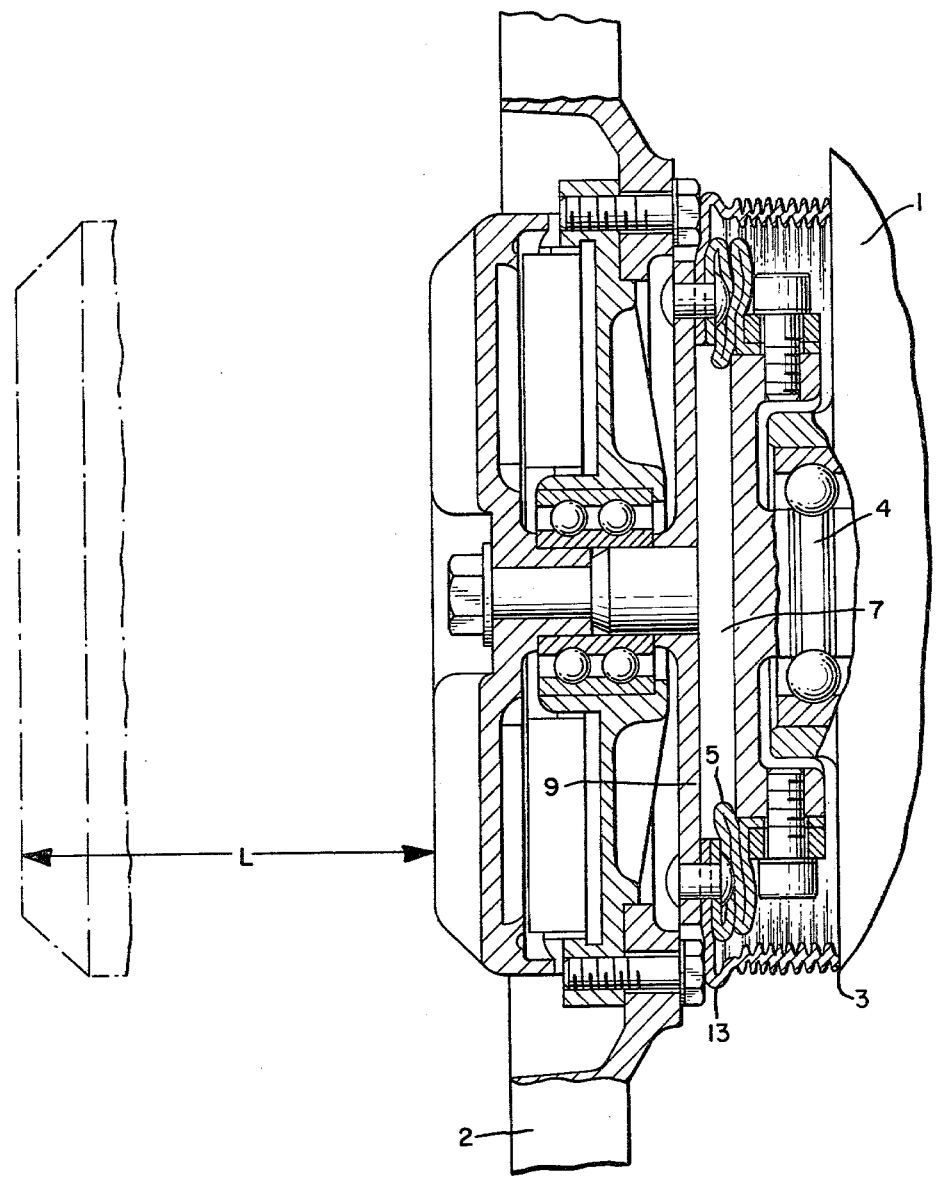
FIG. 2 is an axial cross-sectional view of the arrangement of FIG. 1 in a condition caused by an impact or collision.

FIG. 2 provides an illustration of the position of the fan assembly of FIG. 1 following a collision or the like. As shown in FIG. 2, the flange 7 has been pressed with the shaft 4 against the engine block 1 and the buffer pot 5 between the flanges 7 and 9 has been compressed to a fraction of its total length. Additionally, the pulley 3 and web 13 thereof is deformed by virtue of being forced or urged against the engine block 1.

As shown in FIG. 2, the total "hard length" of the internal combustion engine has been shortened by a distance or length L from the initial position shown in dot-dash lines to the compressed position with the length or distance L being a substantial distance.

Figure 3:
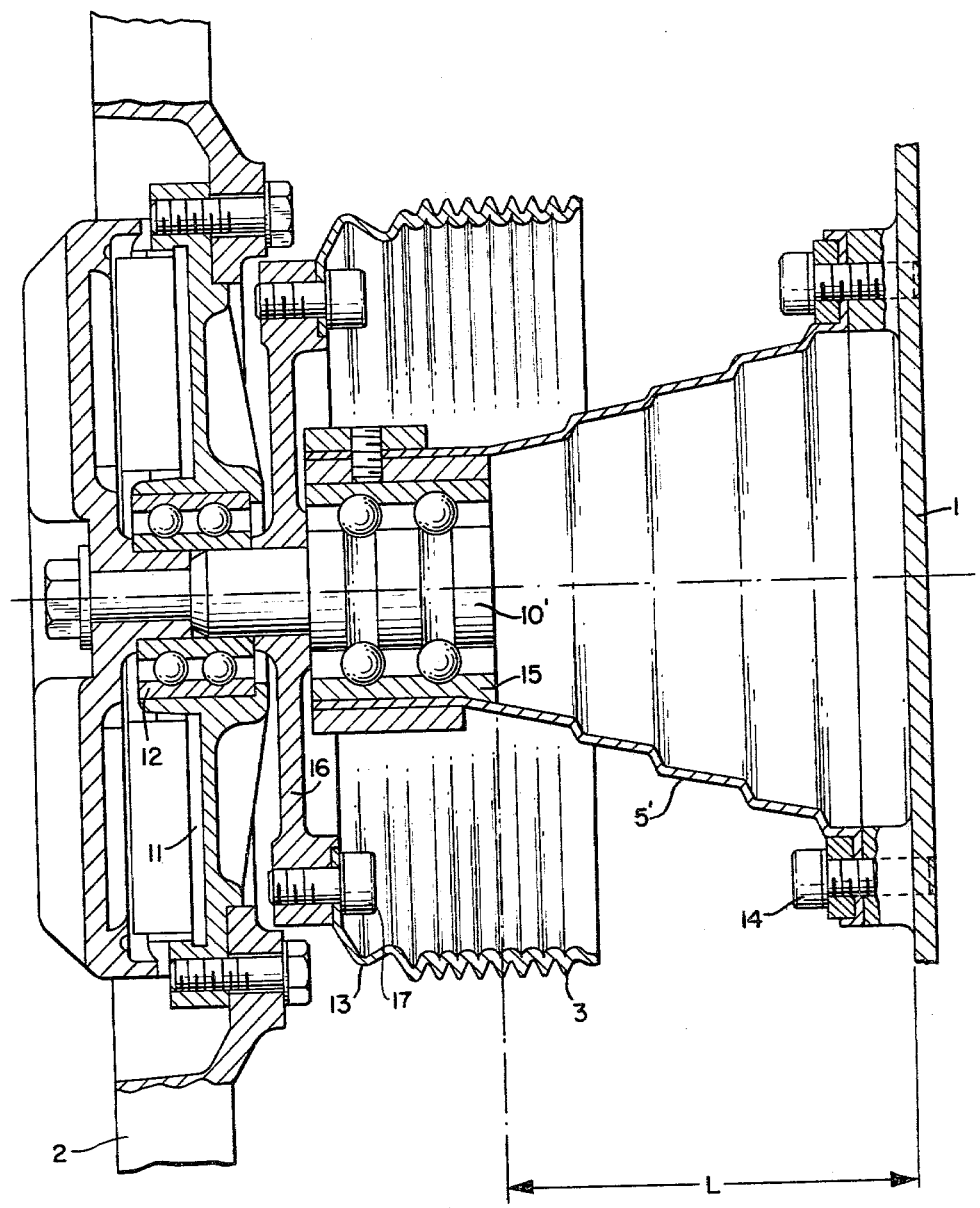
FIG. 3 is an axial cross-sectional view of an internal combustion engine in accordance with the present invention having a cooling fan mounted thereat by means of a buffer and drive of the cooling fan by itself.

As shown in FIG. 3, a buffer or impact absorbing pot-shaped member 5' is arranged between the engine block 1 and the cooling fan 2 with the pot-shaped member 5' being fixedly joined to the internal combustion engine by means of suitable fasteners such as, for example, screws 14. The buffer pot-shaped member 5' tapers inwardly from the engine block outwardly such that a free end of the pot-shaped member 5' has a smaller diameter than the diameter of the member 5' at the engine block 1. At the free end of the buffer pot-shaped member 5', a shaft 10' is supported by way of anti-friction roller bearing means 15 and, by way of an additional anti-friction roller bearing means 12, the cooling fan 2 along with the coupling means 11 is supported on the shaft 10'. A disk 16 is connected to the shaft 10' for rotation therewith with the web 13 of the pulley 3 being attached to the disk 16 by suitable fastening means such as screws 17.

Upon an impact effective on the cooling fan 2, the pot-shaped member 5 is deformed by being turned outside in and the deformation assumes such dimensions that the shaft 10' and bearing means 15' abut the engine block 1. During the deformation process, the pulley 3 and associated web 13 are also deformed and the "hard length" of the internal combustion engine is shortened by a length or distance L.

Figure 4:
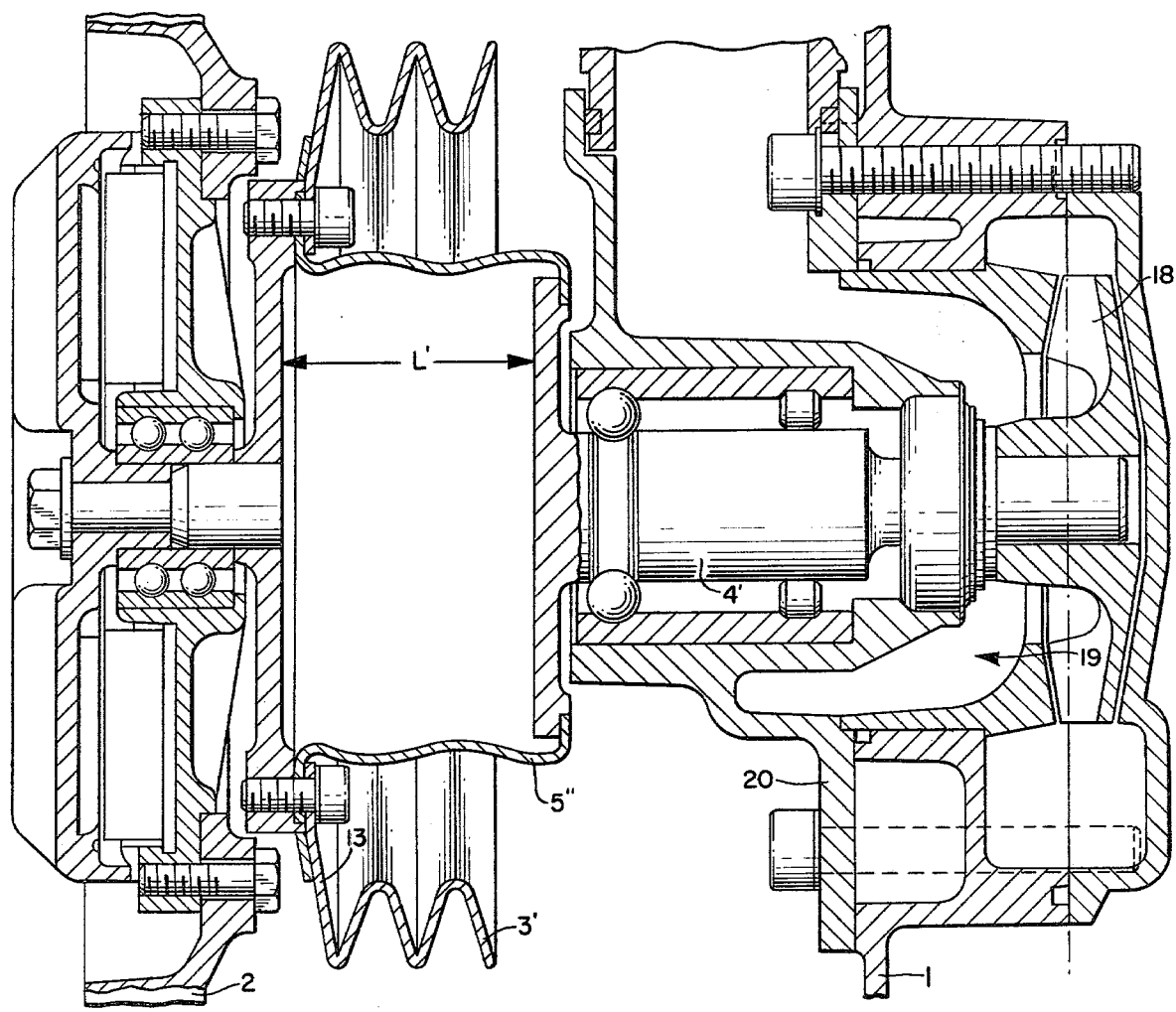
FIG. 4 is an axial cross-sectional view of an internal combustion engine in accordance with the present invention having a cooling fan mounted thereon by way of a corrugated pipe and drive means of the cooling fan with corrugated pipe and with a water pump by means of a pulley.

In the construction of FIG. 4, a buffer or impact absorbing member 5" is provided for supporting the fan 2 with respect to a shaft 4'. The member 5" is constructed or fashioned as a corrugated pipe. The fan 2 is adapted to be driven by way of a pulley 3' which is constructed so as to accommodate two V-belts wherein the shaft 4 simultaneously drives a pump impeller of a water pump 19 located in the engine block 1. An anti-friction roller bearing means is provided for rotatably supporting the shaft 4 in a lid 20 of the water pump 19.

Upon a collision or frontal impact effective on the cooling fan 2, the cooling fan 2 is displaced by a distance L' in a direction toward the internal combustion engine by virtue of the deformation of the member 5" and of the pulley 3' and associated web 13.

Figure 5:
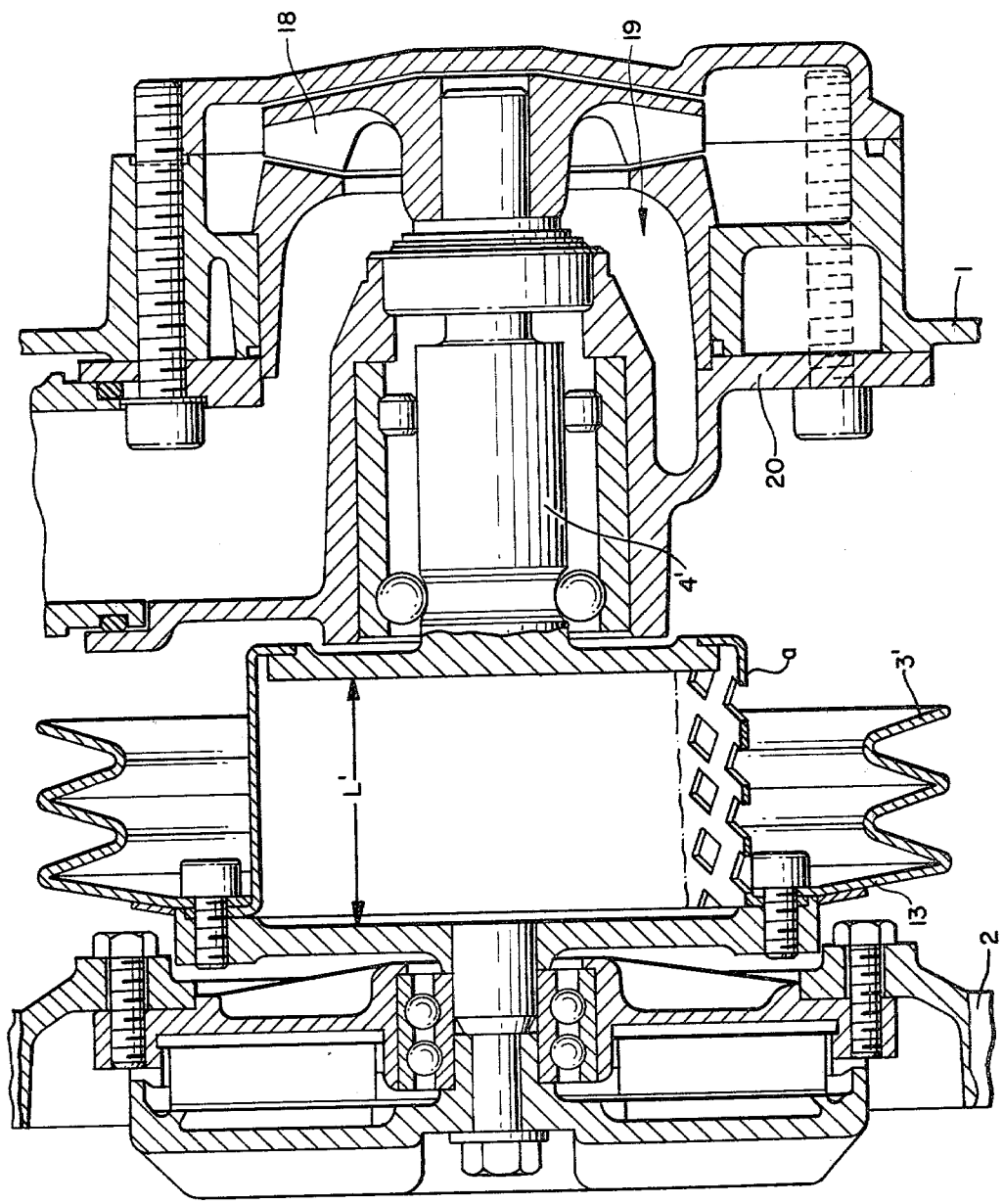
FIG. 5 is a view corresponding to FIG. 4, but modified by the corrugated pipe being replaced by grill-type tube member.
Figure 6:
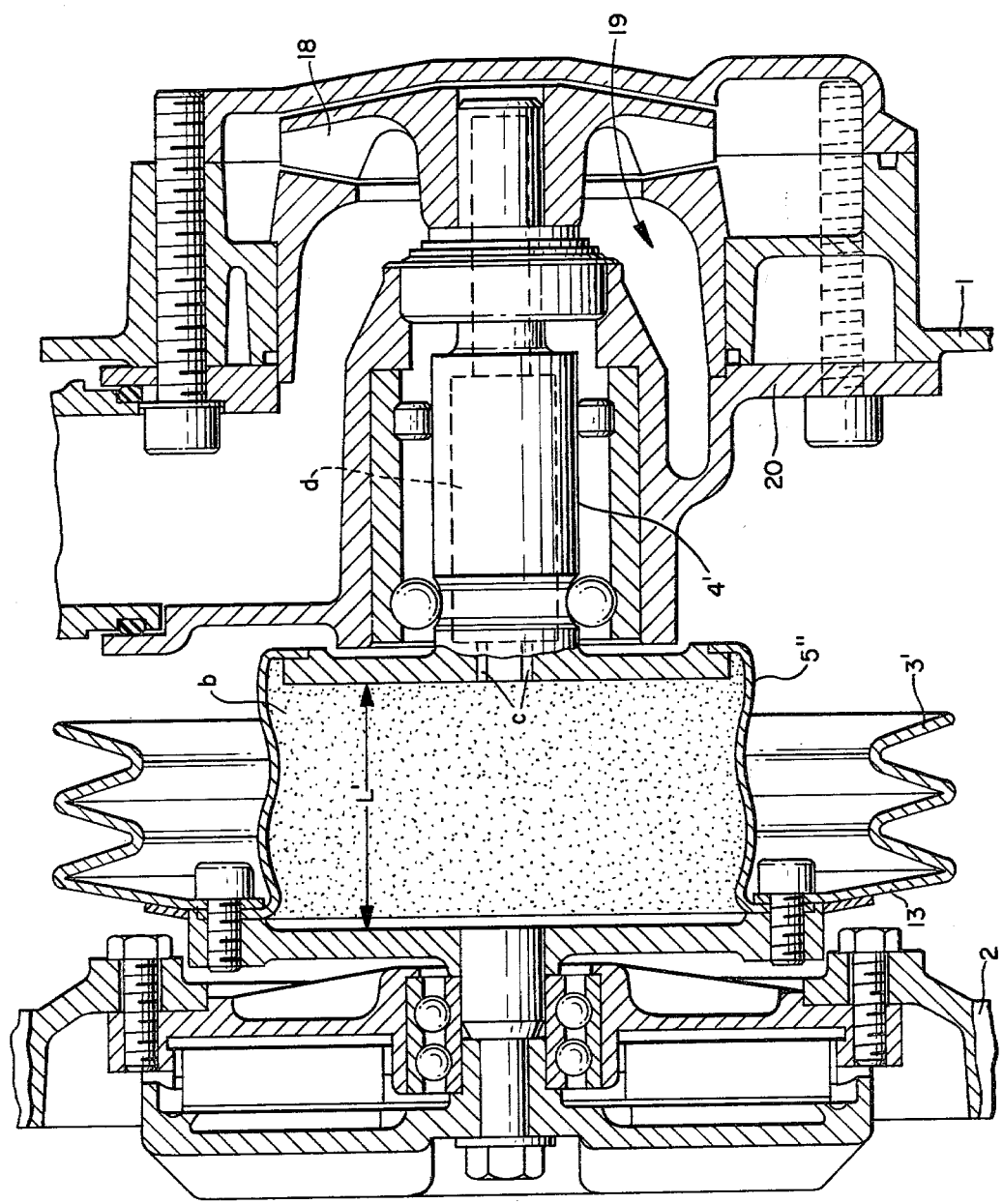
FIG. 6 is a view corresponding to FIG. 4, but modified by a viscous substance being received with the corrugated pipe.

Instead of the buffer pots 5, 5', 5" for mounting and/or in the drive mechanism of a fan 2 such as illustrated in FIGS. 1-4, it is also possible in accordance with the present invention to provide grill-type tube elements a (FIG. 5), lattice-funnel elements, rolled tube elements, scissors-type constructions, and press-fit displacements and spring compressions units. Additionally, it is possible to provide predetermined breaking zones in the housing or crankcase parts, connecting elements, or shafts, and also possible to arrange displacement elements by means of which viscous substances are displaced against a resistance. For example, in FIG. 6 a viscous substance b is shown within tube 5", the substance b being displaced during compression of tube 5" against the resistance created by openings C.

As can be appreciated, the auxiliary units or the like projecting toward the front from the internal combustion engine need not be disposed directly in front of the engine, but rather it is also possible for such units to lie laterally with respect to the internal combustion engine and to project toward the front.

Naturally, the features of the present invention are also applicable to internal combustion engines which are installed at right angles to a longitudinal axis of a passenger vehicle or disposed in a rear engine compartment of a vehicle.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An internal combustion engine arranged in one of a front engine compartment and a rear engine compartment of a motor vehicle, the internal combustion engine including at least one auxiliary driven unit extending from the engine in one of two positions, toward a front of the motor vehicle when the engine is arranged in the front engine compartment and in the other of said positions toward a rear of the vehicle beyond the engine when the engine is arranged in the rear engine compartment, characterized in that means are provided for mounting the at least one auxiliary driven unit on the internal combustion engine, said means being constructed to configurationally shift axially between first and second relatively rigid configurations in response to collision imposed forces in a manner absorbing impact energy by at least one of the auxiliary driven unit and the mounting means through at least one of deformation work, an overcoming of a frictional resistance, and a displacement of a viscous substance against a resistance.

2. An internal combustion engine according to claim 1, characterized in that the mounting means is constructed as a pot-shaped deformation member interposed between the auxiliary driven unit and the internal combustion engine for absorbing impact energy by performing deformation work.

3. An internal combustion engine according to claim 1, characterized in that the mounting means is constructed as a corrugated tube member interposed between the auxiliary driven unit and the internal combustion engine for absorbing impact energy by performing deformation work.

4. An internal combustion engine according to claim 1, characterized in that the mounting means is constructed as a grill-type tube member interposed between the auxiliary driven unit and the internal combustion engine for absorbing impact energy by performing deformation work.

5. An internal combustion engine according to claim 1, characterized in that the mounting means are provided with predetermined zones adapted to break upon an application of a predetermined impact force.

6. An internal combustion engine according to claim 1, characterized in that the mounting means are constructed so as to be telescopically compressible upon an application of a predetermined impact force.

7. An internal combustion engine according to claim 6, characterized in that the mounting means are adapted to displace a viscous substance against a predetermined resistance during a compression thereof.

8. An internal combustion engine according to claim 1, characterized in that the mounting means are constructed so as to be axially shortened during a compression thereof upon overcoming a predetermined frictional force.

9. An internal combustion engine according to claim 8, characterized in that the mounting means are adapted to displace a viscous substance against a predetermined resistance during an axial shortening thereof.

10. An internal combustion engine according to one of claims 1, 2, 3, 6, or 8, characterized in that the auxiliary driven unit includes a drive pulley means, the drive pulley means includes track means for accommodating drive belt means and pulley rims, and in that the pulley rims of the pulley means are constructed so as to be collapsible in an axial direction.

11. An internal combustion engine according to claim 10, characterized in that the pulley means further includes hub means, connecting means are provided for connecting the pulley rim of the pulley means to the hub means, and in that the connecting means are constructed so as to be outwardly deformable upon an application of a predetermined impact force.

* * * * *